Feb. 2, 1926.
S. G. DOWN
AUTOMOTIVE BRAKE
Filed March 11, 1924
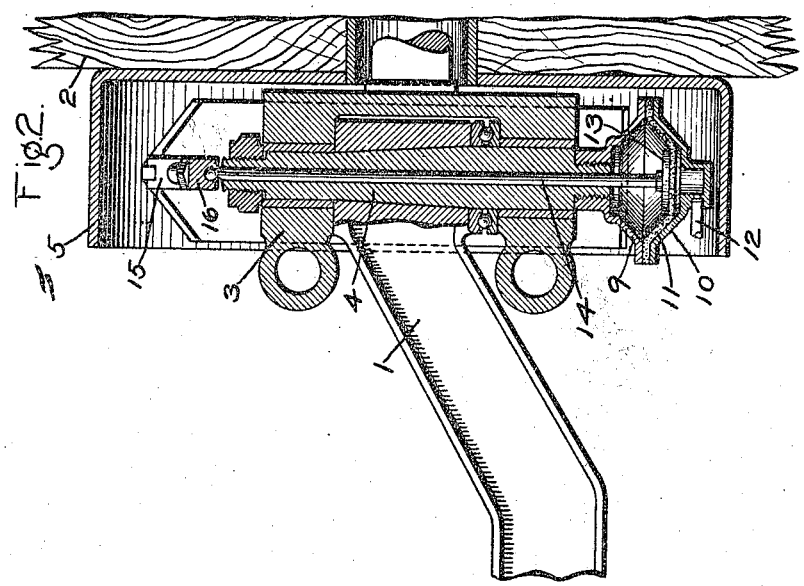
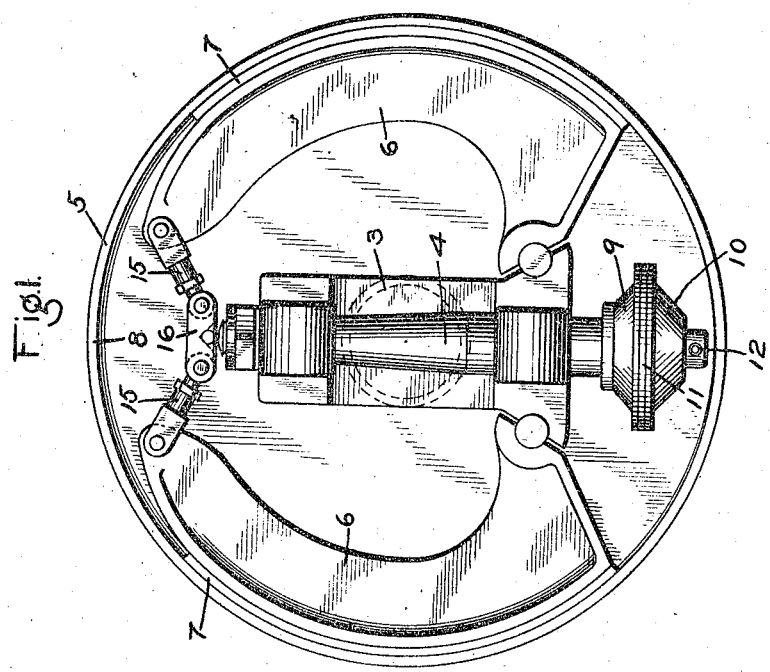
INVENTOR
SIDNEY G. DOWN
BY
ATTORNEY Patented Feb. 2, 1926.

1,571,244

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed March 11, 1924. Serial No. 698,507.

*To all whom it may concern:*

Be it known that I, SIDNEY G. DOWN, a citizen of the United States, residing at Pittsburgh, in the county of Allegheny and State of Pennsylvania, have invented new and useful Improvements in Automotive Brakes, of which the following is a specification.

This invention relates to brakes, and more particularly to a front wheel fluid pressure brake for a motor vehicle.

The principal object of my invention is to provide an improved brake of the above character.

In the accompanying drawing; Fig. 1 is a face view of a fluid pressure front wheel brake mechanism embodying my invention; and Fig. 2 a central sectional view of the construction shown in Fig. 1.

In the drawing, the reference numeral 1 indicates the front axle of a motor vehicle and 2 the front wheel. Said wheel is supported by a steering knuckle 3 which is connected to the front axle by the pintle pin 4.

Secured to the front wheel 2 is a brake drum 5 having mounted therein a pair of pivoted brake heads 6, each provided with a brake shoe 7 adapted to frictionally engage the internal friction face 8 of the brake drum 5.

Secured to the lower end of the pintle pin 4 is a flanged brake chamber 9 and secured to said chamber is a flanged cover plate 10. Intermediate the brake chamber 9 and the cover plate 10 is a flexible diaphragm 11, the chamber at one side of said diaphragm being connected to a fluid pressure supply and exhaust pipe 12.

A pressure plate 13 engages the other side of the diaphragm 11 and secured to said plate is a rod 14 which extends upwardly through a central bore in the pintle pin 4.

Pivotally attached to each free end of the brake heads 6 are links 15, said links being pivotally connected by a link or crosshead 16. The crosshead 16 is provided with a depression or socket at its under face for receiving the ball shaped end of the rod 14.

When fluid under pressure is supplied through pipe 12 to the diaphragm 11, said diaphragm is moved upwardly, causing an upward movement of the rod 14. The crosshead 16 is thus forced upwardly so as to cause the links 15 to spread the ends of the brake heads 6 and thereby the brake heads are expanded so that the brake shoes 7 are brought into frictional engagement with the friction face 8 of the brake drum 5, thus effecting an application of the brakes at the front wheel of the vehicle.

By the above described construction, the fluid pressure brake chamber is disposed wholly within the brake drum, thus providing a neat compact construction.

Having now described my invention, what I claim as new and desire to secure by Letters Patent, is:—

1. In a vehicle brake, the combination with a front wheel of a motor vehicle, a steering knuckle, and a pintle pin mounted in said knuckle, of a brake drum secured to the front wheel, brake heads mounted in said drum, a fluid pressure brake chamber secured to said pin, a movable abutment in said chamber, and a rod operable by said abutment and extending through said pintle pin and operatively connected to said brake heads.

2. In a vehicle brake, the combination with a front wheel of a motor vehicle and a steering connection for said wheel including a pintle pin, of a brake drum secured to said wheel, brake heads mounted in said drum, a fluid pressure brake chamber secured to one end of said pin, a movable abutment in said chamber, and a rod extending through a central bore in said pintle pin and operable by said abutment and having an operative connection with said brake heads at the other end of said pintle pin.

In testimony whereof I have hereunto set my hand.

SIDNEY G. DOWN.